United States Patent
Steenson, Jr. et al.

(10) Patent No.: US 6,332,103 B1
(45) Date of Patent: Dec. 18, 2001

(54) APPARATUS AND METHOD FOR A PITCH STATE ESTIMATOR FOR A PERSONAL VEHICLE

(75) Inventors: James Henry Steenson, Jr., Derry, NH (US); Burl Amsbury, Cambridge, MA (US)

(73) Assignee: Deka Products Limited Partnership, Manchester, NH (US)

( * ) Notice: Subject to any disclaimer, the term of this patent is extended or adjusted under 35 U.S.C. 154(b) by 0 days.

(21) Appl. No.: 09/458,148

(22) Filed: Dec. 9, 1999

Related U.S. Application Data

(60) Provisional application No. 60/142,007, filed on Jun. 30, 1999.

(51) Int. Cl.[7] ................ G06F 17/00; G06F 7/00
(52) U.S. Cl. .................... 701/1; 701/33; 701/38; 701/60; 701/63; 180/7.1; 37/348; 172/9
(58) Field of Search ................ 701/1, 4, 29, 33, 701/38, 50, 58, 60, 63, 124; 180/7.1, 8.2, 907; 37/348; 172/3, 9; 345/158

(56) References Cited

U.S. PATENT DOCUMENTS

| | | | |
|---|---|---|---|
| 3,984,748 | 10/1976 | Sullivan | 318/648 |
| 4,212,443 | 7/1980 | Duncan et al. | 244/177 |
| 4,244,215 | 1/1981 | Merhav | 73/173 R |
| 4,442,723 | 4/1984 | Auer | 74/5.47 |
| 4,507,737 | 3/1985 | LaSarge et al. | 364/453 |
| 5,194,872 | 3/1993 | Musoff et al. | 342/358 |
| 5,670,780 | 9/1997 | Lewis | 250/231.14 |
| 5,701,965 | 12/1997 | Kamen et al. | 180/7.1 |
| 5,712,426 | 1/1998 | Sapuppo et al. | 73/504.03 |
| 5,764,014 | 6/1998 | Jakeway et al. | 318/587 |
| 5,791,425 | * 8/1998 | Kamen et al. | 180/7.1 |
| 5,854,843 | 12/1998 | Jacknin et al. | 381/25 |
| 5,860,480 | 1/1999 | Jayaramane et al. | 172/2 |

FOREIGN PATENT DOCUMENTS 6-105415    12/1994   (JP).

* cited by examiner

Primary Examiner—William A. Cuchlinski, Jr.
Assistant Examiner—Gertrude Arthur
(74) Attorney, Agent, or Firm—Bromberg & Sunstein LLP

(57) ABSTRACT

An apparatus and method for a pitch state estimator is provided. The pitch state estimator generates a pitch state signal for establishing the orientation used in the control of a ground-traversing vehicle. The vehicle has a support for supporting a load which is preferably a human passenger. In one embodiment, the pitch state estimator includes a pitch sensor connected to the vehicle producing a pitch signal representing an estimate of a pitch angle of the vehicle. The pitch angle is associated with a coordinate system referenced to gravity. The pitch state estimator also includes at least one inertial reference sensor connected to the vehicle producing an inertial orientation signal with respect to the vehicle. Further included is a state estimator module for receiving the pitch signal and the inertial orientation signal and calculating a pitch state signal from the inertial orientation signal and the pitch signal sensor. The pitch state signal is provided to a control loop of the vehicle for dynamically maintaining stability of the vehicle.

39 Claims, 6 Drawing Sheets

APPARATUS AND METHOD FOR A PITCH STATE ESTIMATOR FOR A PERSONAL VEHICLE

This application claims priority from U.S. Provisional Application, Ser. No. 60/142,007, filed Jun. 30, 1999, which is incorporated herein by reference.

TECHNICAL FIELD

The present invention pertains to a device and methods for estimating the pitch state of a personal vehicle for purposes of control of the vehicle.

BACKGROUND

Various methods and devices exist for measuring pitch of a vehicle. Pitch is defined as the angle, denoted as $\Theta$, between a specified vehicle-fixed substantially vertical axis, denoted as R and the true vertical axis as defined by gravity. R may be defined, for example, by a seat back or other vehicle-fixed structure. The term pitch is synonymous with inclination within the following disclosure and appended claims. Pitch sensing devices include accelerometers, inclinometers, pendulous reference sensors, also known as tilt sensors, and distance probes.

Single axis state estimators (SASEs), can provide an estimate of the pitch of a vehicle over regular surfaces under most expected conditions. The pitch state becomes inaccurate where the vehicle makes certain changes in direction, such as, turning the vehicle around on a sloped surface. In such a situation, a SASE may indicate that the vehicle still has a positive pitch even though the vehicle is facing downward where the inclinometer should indicate a negative pitch. The sensors saturate if the pitch suddenly changes so that the pitch rate is above the temporal threshold at which the device may measure change.

SUMMARY OF THE INVENTION

In accordance with one embodiment of the invention, an apparatus and method for a pitch state estimator is provided. The pitch state estimator generates a pitch state signal for establishing the orientation used in the control of a ground-traversing vehicle. The vehicle has a support for supporting a load which is preferably a human passenger. In one embodiment, the pitch state estimator includes a pitch sensor connected to the vehicle producing a pitch signal representing an estimate of a pitch angle of the vehicle. The pitch angle is associated with a coordinate system referenced to gravity. The pitch state estimator also includes at least one inertial reference sensor connected to the vehicle producing an inertial orientation signal with respect to the vehicle. Further included is a state estimator module for receiving the pitch signal and the inertial orientation signal and calculating a pitch state signal from the inertial orientation signal and the pitch signal sensor. The pitch state signal is provided to a control loop of the vehicle for dynamically maintaining stability of the vehicle.

In another embodiment, a pitch-angle error signal is calculated based on the pitch signal and the inertial orientation signal and is fed back to the state estimator module to adjust the inertial orientation signal. In other embodiments the at least one inertial reference sensor is a gyroscope.

The pitch state estimator may further include a virtual gyro construction module for receiving the inertial orientation signals of the gyroscopes and outputting to the state estimator module three rotation rate signals. Each rotation rate signal represents a rotation rate about one axis of three perpendicular axes having an origin at the center of gravity of the vehicle.

The state estimator module may further include a rotation correction module which transforms the three rotation rate signals producing three corrected rotation rates so that the three rotation rate signals correspond to the coordinate system of the pitch signal. The state estimator module also may include an integrator module for producing orientation angles based on the three corrected rotation rate signals and a summer which receives the inertial orientation signals. The state estimator module further includes a gyro-bias integrator which calculates a bias signal based at least on the pitch signal and the orientation angles, the bias signal being output to the summer. In this embodiment, the output signal of the summer is fed back into the rotation correction module.

In another related embodiment, a fault detection module is included for detecting erroneous inertial orientation signals produced by an inertial reference sensor. Once an erroneous inertial orientation signal is detected, the fault detection module determines that a gyroscope has failed.

In another embodiment, the state estimator module performs a single axis estimate of the pitch state if a gyroscope has failed.

A pitch state signal may be generated in one embodiment by first measuring an estimated pitch of the vehicle with respect to gravity using an inclination sensor. The estimated pitch measurement is converted into a digital estimated pitch signal and then the inertial orientation rates of the vehicle are measured using at least three inertial sensors positioned in three or more distinct orientations on the vehicle. The inertial orientation rate measurements of the three or more inertial orientation sensors are converted into three or more digital inertial orientation signals. Finally, a pitch state signal is calculated in a state estimator module based in part on the digital inertial orientation signals and the digital pitch signal.

BRIEF DESCRIPTION OF THE DRAWINGS

The invention will be more readily understood by reference to the following description, taken with the accompanying drawings, in which.

DETAILED DESCRIPTION OF THE EMBODIMENTS

U.S. Pat. Nos. 5,701,965 and 5,791,425 describe personal vehicles that require measurement of instantaneous pitch state for active control of vehicle stability. These patents are incorporated by reference herein in their entirety. Various embodiments of the methods and apparatus disclosed herein for estimating the pitch state of a vehicle may be used with these vehicles. "Pitch state" as used in this description and the appended claims includes both the pitch in the fore-aft plane and the pitch rate of the vehicle, i.e. $\Theta$ and $\Theta_r$, where $\Theta_r$ is the time rate of change of $\Theta$.

Figure 1:
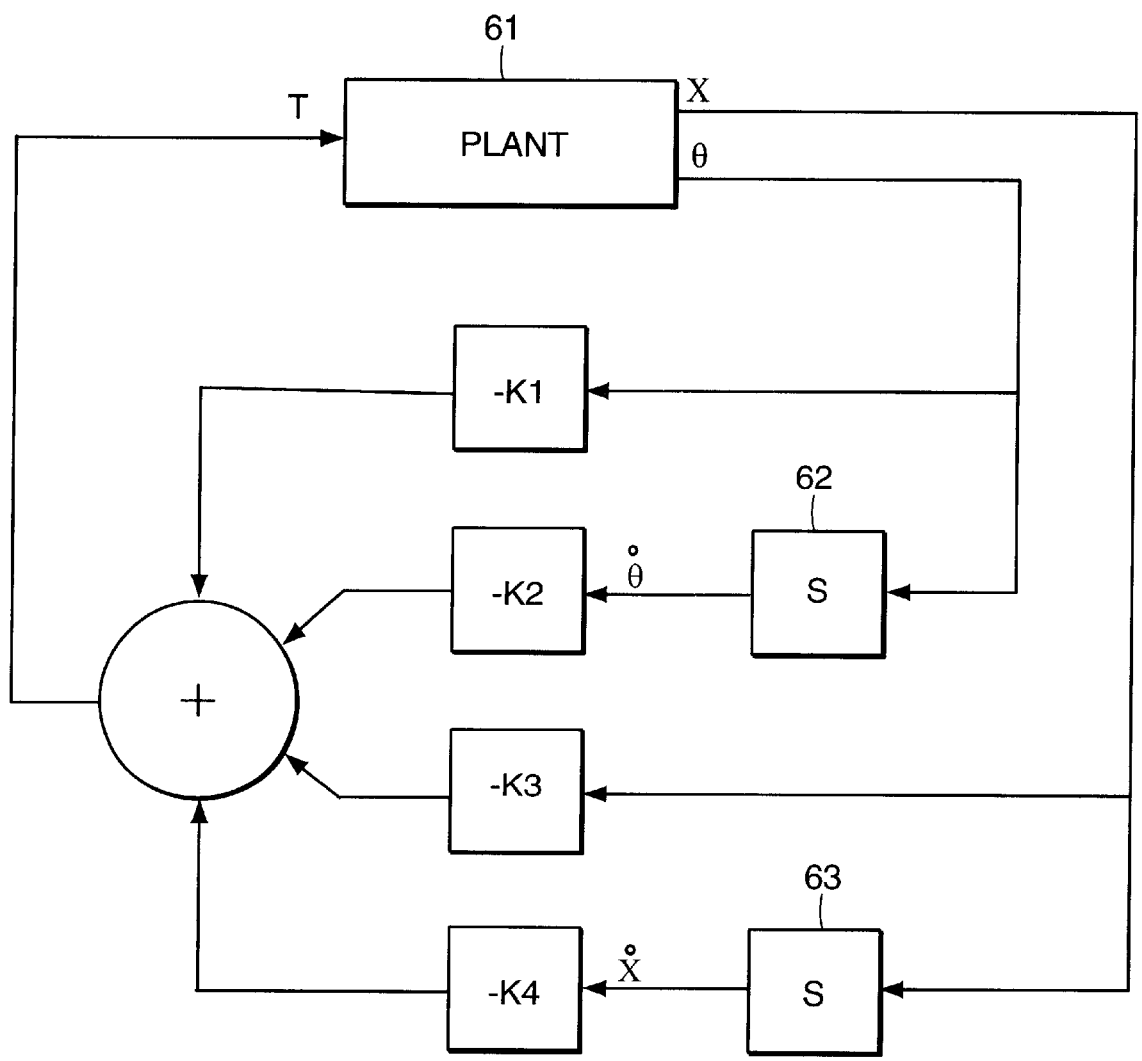
FIG. 1 is a block diagram of a prior art control loop for dynamically controlling the stability of a vehicle in the fore-aft plane.

Such vehicles may include a control loop as shown in FIG. 1 for dynamically maintaining stability of the vehicle in the fore-aft plane so that the vehicle remains upright. This control loop requires the pitch state as input.

The plant of FIG. 1 is equivalent to the equations of motion of a locomotion system driven by a single motor. T identifies the wheel torque. In addition to pitch the character $\Theta$ identifies the fore-aft inclination i.e. the pitch angle, X identifies the fore-aft displacement along the surface relative to a reference point, and the subscript r denotes a variable differential with respect to time. The remaining portion of the figure is the control used to achieve balance. The boxes 62 and 63 indicate differentiation. To achieve dynamic control and to insure stability of the system, and to keep the system in the neighborhood of a reference point on the surface, the wheel torque T in this embodiment is set to satisfy the following equation:

$$T = K_1\Theta + K_2\Theta_r + K_3X + K_4X_r$$

The gains $K_1$, $K_2$, $K_3$, and $K_4$ are dependent on settings of the control loop, physical parameters of the system, and other effects such as gravity.

The dynamic behavior of a vehicle may be described through reference to a coordinate system. Two such coordinate systems are used in describing the motion of a vehicle about irregular surface: the Earth reference frame, "E-frame", and the vehicle reference frame "V-frame".

Figure 2:
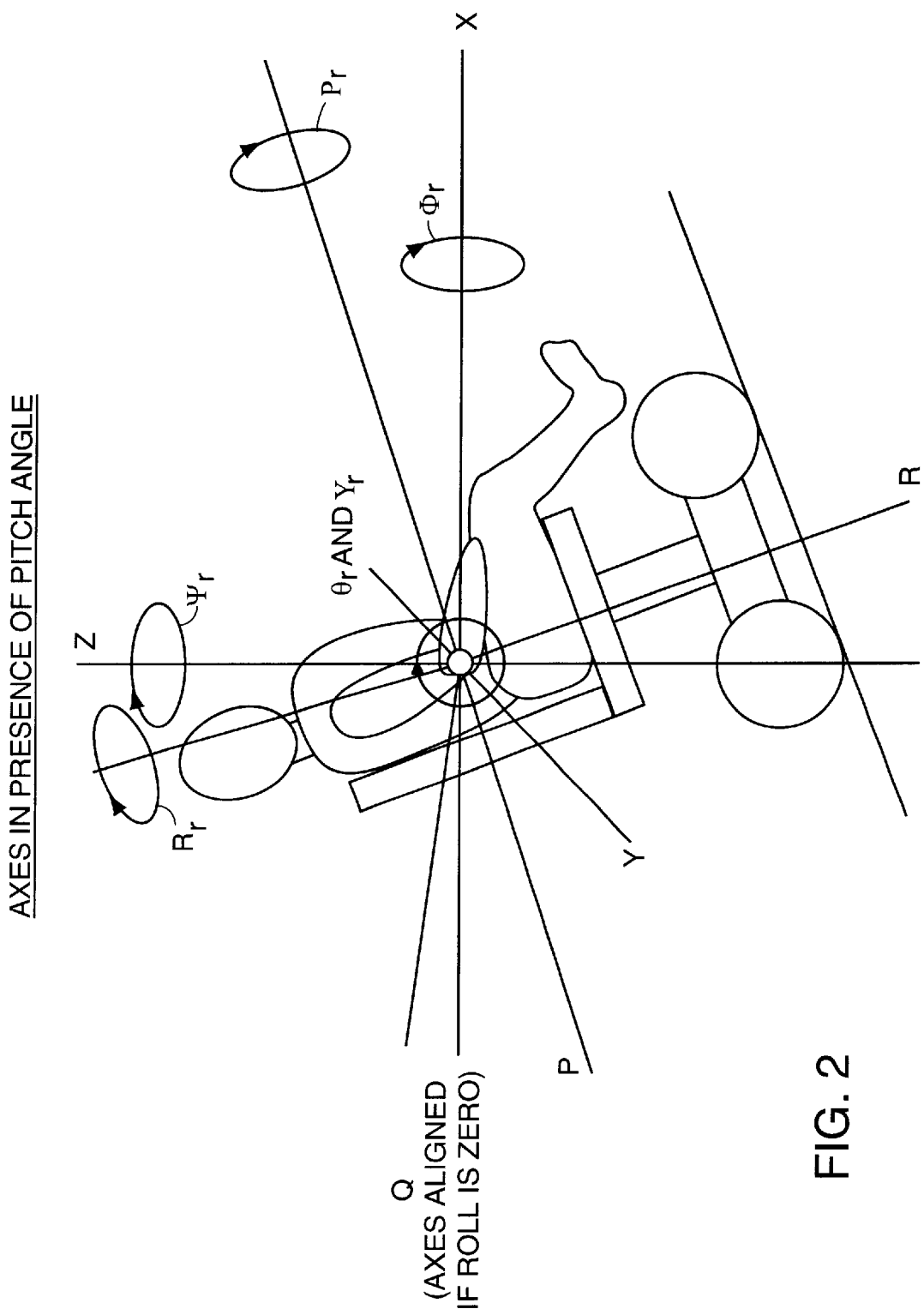
FIG. 2 is a diagram showing a land-based vehicle and corresponding vehicle frame (V-frame) coordinate axes in the presence of a pitch angle along with the Earth frame (E-frame) coordinate axes of the earth.

The E-frame defines the vertical axis, Z, to be co-linear to the direction of gravity and passing through the center of gravity of the occupied vehicle as shown in FIG. 2. The position of the origin of the axes about the center of gravity is an arbitrary choice and it should be understood by those skilled in the art that the origin may be positioned about other points on the vehicle. The E-frame defines the roll axis, X, as a component in the direction of travel perpendicular to the vertical axis and passing through the center of gravity of the occupied vehicle, and the E-frame defines the pitch axis, Y, to be orthogonal to both the Z and X axes and passing through the center of gravity of the occupied vehicle. Rotation around the Z axis is described by the angle "$\Psi$", also known as the yaw angle. Rotation around the X axis is described by the angle "$\Phi$", also known as the roll angle. Rotation around the Y axis is described by the angle "$\Theta$", also known as the pitch angle.

Figure 3:
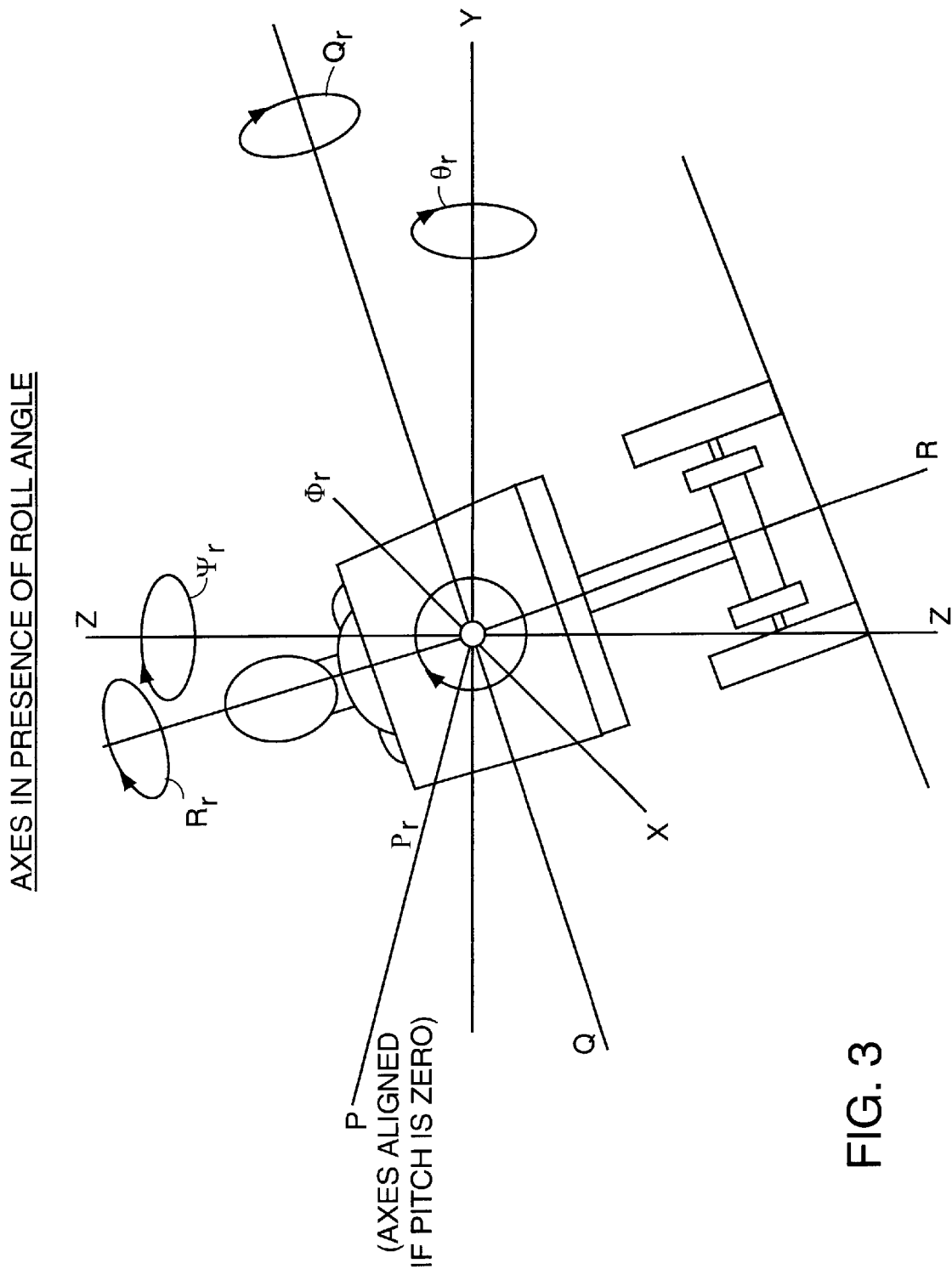
FIG. 3 is a diagram showing the relation of the E-frame to the V-frame when the pitch angle is zero; and the roll angle is non-zero.

The axes associated with the V-frame have an origin positioned at the center of gravity of the vehicle. In other embodiments, the origin of the axes may be situated at another point on the vehicle. The axes are fixed with respect to the vehicle. The relative vertical axis, R, is a specified vehicle-fixed substantially vertical axis and may be defined by a line passing through the center of gravity of the vehicle and the support/backrest/head of the operator of the vehicle. The relative horizontal axis, P, is perpendicular to the relative vertical axis and has a component parallel to the direction of movement of the vehicle. The third axis, Q, is orthogonal to both R and P. The relative orientation of the R,P,Q frame varies with respect to the Z,X,Y frame as the vehicle tilts. As shown in FIG. 2, the Q and Y axes are co-linear however R and Z, and X and P are not. In such a case, the vehicle is "pitching" and thus it has a non-zero value for $\Theta$. FIG. 3 shows P and X axes to be co-linear where the R and Z and Q and Y axes are not. In this configuration, there is a non-zero roll angle, $\Phi$.

The equations below present the rate transformations between the E-frame and V-frame under a small angle approximation for the respective rotation rates, denoted by the subscript r. These transformations will be referred to as small angle Euler transforms (SAETs) and inverse SAETs respectively.

$$\begin{bmatrix} \Phi_r \\ \Theta_r \\ \Psi_r \end{bmatrix} = \begin{bmatrix} 1 & \Theta\Phi & -\Theta \\ 0 & 1 & \Phi \\ 0 & -\Phi & 1 \end{bmatrix} \begin{bmatrix} P_r \\ Q_r \\ R_r \end{bmatrix}$$

$$\begin{bmatrix} P_r \\ Q_r \\ R_r \end{bmatrix} = \begin{bmatrix} 1 & 0 & \Theta \\ 0 & 1 & -\Phi \\ 0 & \Phi & 1 \end{bmatrix} \begin{bmatrix} \Phi_r \\ \Theta_r \\ \Psi_r \end{bmatrix}$$

Rate sensors such as angular rate sensors or rate gyroscopes, hereinafter referred to as gyros are used to provide pitch state information to a vehicle. The rate sensors measure the rate of change of the orientation of the vehicle about the V-frame and produce a signal which is representative of the rate of change of the pitch, roll, and yaw angles of the vehicle. The rate sensors need to be adjusted regularly due to sensor drift. Thus, tilt sensors are incorporated into the system for providing a stable angular value from which bias errors of the rate sensors may be compensated for. In a preferred embodiment of the invention the rate sensors are gyros, however in other embodiments they may be any other inertial measurement devices. Through various signal transformations, as explained below, a system for accurately measuring the pitch state based in part on the pitch rate signal obtained from the orientation sensors and the pitch signal from the inclinometer may be calculated.

Figure 4:
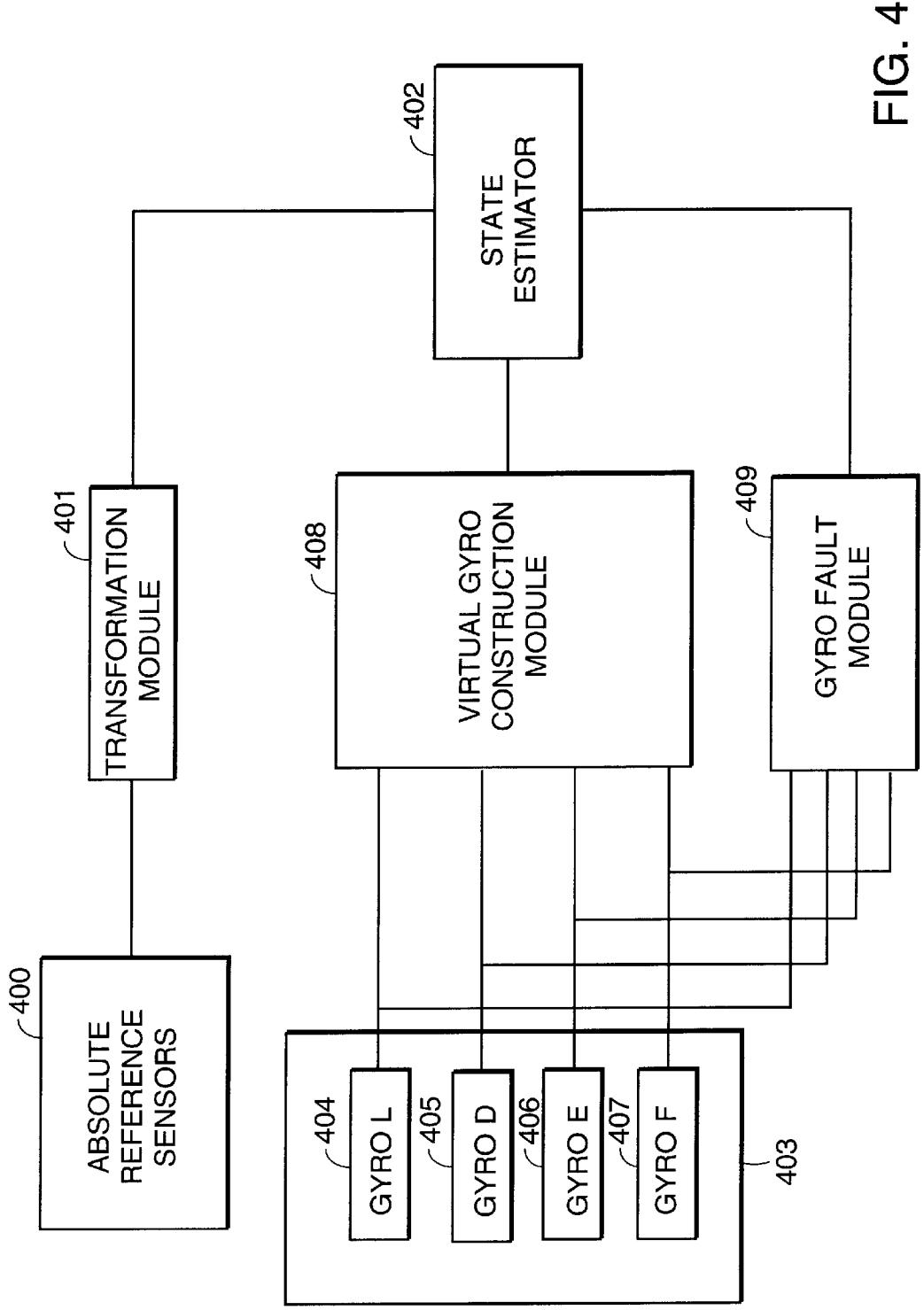
FIG. 4 is a block diagram showing the system architecture for one embodiment of the invention.

FIG. 4 shows the system architecture of one embodiment of the invention. Absolute reference sensors 400 send signals to the transformation module 401 where the signal produced by the sensor is converted to a useful digital data format and adjusted for known sources of error. Absolute reference sensors 400 which are a special case of accelerometers include sensors that measure quantities with respect to the E-frame such as pendulous reference sensors, also known as tilt sensors. Absolute reference sensors also include sensors capable of measuring the rotation of the wheels of a vehicle to produce a signal of the difference in wheel velocities.

The transformation module 401 provides to the state estimator 402 information corresponding to the pitch angle and roll angle when the vehicle is unaccelerated except for the force of gravity, and the difference in wheel velocities. The difference in wheel velocities provides an absolute value for the yaw rate assuming the wheels do not slip.

Relative reference sensors 403 measure quantities with respect to the V-frame and may include gyroscopes such as mechanical or solid-state gyroscopes. In order to provide information on the three orientations, at least three single axes gyroscopes are required. Additional gyroscopes may be used to provide fault-tolerance capability. FIG. 4 shows one embodiment of the invention where the relative reference sensors 403 consists of gyro L 404, gyro D 405, gyro E 406, and gyro F 407. In the preferred embodiment four one-degree-of-freedom gyroscopes are used. Gyro L 404 may be mounted on the vehicle such that it measures $Q_r$ of the vehicle. In such an embodiment, the remaining three gyros 405 406 407 are mounted on the vehicle at various orientations and measure a combination of the $Q_r$, $P_r$, and $R_r$. The selection of the mounting orientations balance factors such as sensor signal range and accuracy. The gyroscopes may be placed on the principle axis of the vehicle, but in a preferred embodiment the gyroscopes are placed off the axis and non-colinear to each other. This provides redundancy among the gyroscopes. If one of the gyroscopes fails, a value for $P_r$, $Q_r$, or $R_r$ may still be calculated, since the other gyroscopes measure $P_r$, $Q_r$, and $R_r$ components. Additionally, the gyroscopes are set off axes in a preferred embodiment because the vehicles capabilities may be greater than the measurement range of the gyroscopes. For example, the angular rate during a sharp turn could be beyond the measurement range of the gyroscopes. By canting the gyroscopes, the measured rate is scaled by the cosine of the angle between the rotation axis and the canted axis and also resulting in the cross coupling of other orthogonal rate components.

The relative reference sensors 403 transform the angular rate sensed into a digital signal of the represented angular rate and pass the signal to a virtual-gyro construction module 408. Since the orientation of the gyroscopes may not be aligned with the Q, P, and R axes each signal produced by the gyroscope may be comprised of rate information about multiple axes. The virtual gyro construction module 408 transforms the signals to produce three output signals that correspond to the signals that three virtual gyros would produce if oriented to measure the rotation about the P, Q, and R axes. This operation on the gyro signals produces the virtual gyro $Q_r$, $P_r$, and $R_r$ information. The virtual gyro construction module performs the matrix equation, V=M G where V is the virtual gyro vector, G is the gyro output vector, and M is a 3×4 construction matrix that converts the four gyro signals in G to the virtual gyro vector, V. The construction matrix is not unique and can be the inverse least squares solution, or the output of any one of the four combinations of three of the four gyros or any combination of the solutions. The coefficients of the construction matrix are determined during the calibration of the vehicle and contain both corrections for gyro alignment and for the individual gyro characteristics. In the preferred embodiment, the construction matrix provides greater fault tolerance for gyroscopes D, E, and F through a combination of the solutions selected from the least squares solution and the four three-gyroscope combinations.

A gyro fault detection signal from the gyro fault detection module 409 is also generated from the raw signals which is passed to the state estimator 402. The gyro fault detection module will be explained below with regard to FIG. 5.

The state estimator 402 takes the signals from the virtual gyro-construction module 408, the gyro fault detection module 409, and the calibration-transformation module 401 and estimates the pitch state of the vehicle. The state estimator 402 also estimates the roll state and yaw state of the vehicle, but in a preferred embodiment of the invention, only the pitch state of the vehicle is passed on to the control loop for balancing the vehicle about the vehicle's center of gravity.

Although FIG. 4 illustrates the use of four gyros in one embodiment of the invention, any number above three may be used to provide increasing fault-tolerant capability to the system.

Figure 5:
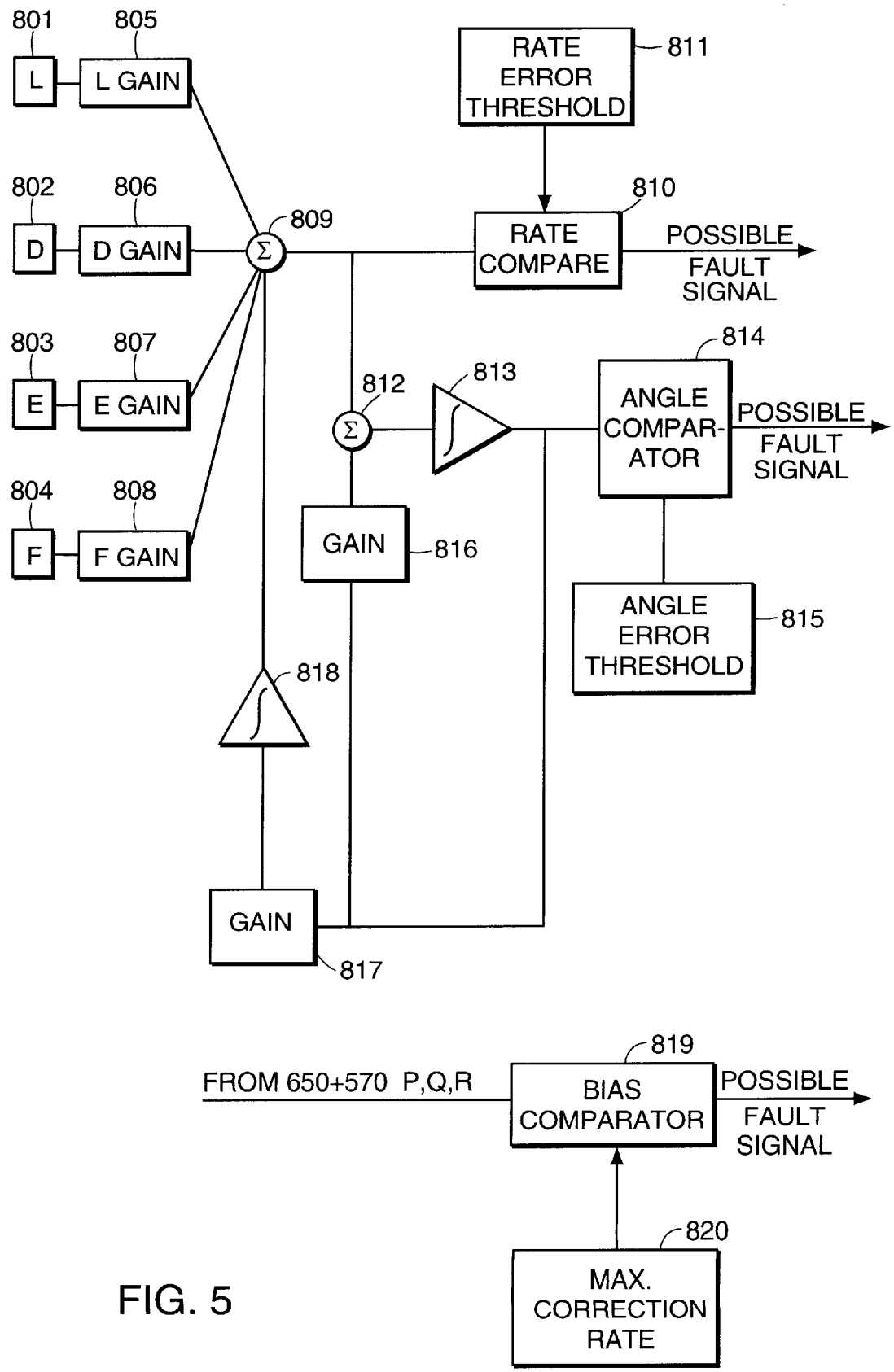
FIG. 5 is a block diagram of the fault detection module

FIG. 5 provides a detailed view of the fault detection module 409 which shows multiple fault detectors. Each of the four gyroscopes produces a signal which is the raw signal from the gyroscope. The raw signals are passed through filters which are represented by 805, 806, 807 and 808. The coefficients of the filters are configured upon assembly so that the resulting sum should be ideally zero at summer 809. If the gyroscopes move out of alignment, drift out of specification, or fail, the sum will not be equal to zero. In the preferred embodiment, the input to the summer is the difference between two pitch rates. The pitch rates are determined based upon a selection of the pitch components of three of the four gyroscopes. The sum resulting from 809 is then compared in 810 to a rate error threshold 811. If the pitch rate exceeds the worst case pitch error rate a gyroscope fault is declared and the system defaults to a single axis state estimator mode.

The sum from summer 809 is passed into summer 812 and then integrated to produce a pitch error. The pitch angle is then compared in the angle comparator 814 to the angle error threshold of 815. The angle error threshold 815 allows an error due to the aging of the gyroscope or any angle deviation to be rejected that is capable of being corrected while still declaring a gyroscope fault if the error cannot be corrected. As explained below, gyroscope drift is reduced over time by the feedback loop filter of FIG. 6 which includes signal attenuator 560. As with the drift error, the angle error due to the aging is slowly reduced through the same feedback loop. In the preferred embodiment the feedback loop is designed to compensate for inaccuracies over the course of several minutes. If the gyroscope loses too much sensitivity and becomes very inaccurate then the pitch angle may be such that it is uncomfortable or unsafe for the user during the several minutes in which the filter is compensating for the inaccuracy. Therefore, even though the error could be compensated for given a long enough period of time, the system recognizes that a large pitch angle is indicative of a gyroscope failure. The error angle threshold is determined by user comfort considerations and safety and is set at 3.2 degrees in the preferred embodiment although the system may variably adjust the error angle threshold based upon the orientation of the vehicle. A threshold set to the lower range would require more accurate components or would result in more gyroscope faults. A higher threshold would result in less gyroscope faults but would be more apparent to the rider. If the error angle is exceeded, a gyro fault is declared and the system resorts to a single axis state estimation mode.

Two additional filters are placed in the module 816 and 817. These filters are the same as the signal attenuators of FIG. 5 540 and 560 respectively. The angle output is then attenuated in gain 817 and then integrated in integrator 818 which provides the bias adjustment. Filter 817 accounts for long term bias drift. Filter 816 provides attenuation of the angle signal which is passed back to summer 812 and is provided to stabilize the second order filter and prevent oscillation.

Multiple rate bias correction signals are provided from the state estimator, explained below, and include signals for P, Q, and R from integrator 570 and the local gyroscope bias error from local gyro bias error module 650. The rate bias correction signals are compared in bias comparator 819 to a maximum correction rate. A gyroscope failure is declared when a rate bias correction signal exceeds the maximum correction rate. Gyroscopes that are failing slowly or that have gone out of specification are identified by this comparison. In the preferred embodiment the maximum correction rate allowed is greater than 10 degrees per second although other maximum correction rates may be used. If the threshold is exceeded, a gyroscope fault is declared and the system resorts to the single axis estimation mode.

Figure 6:
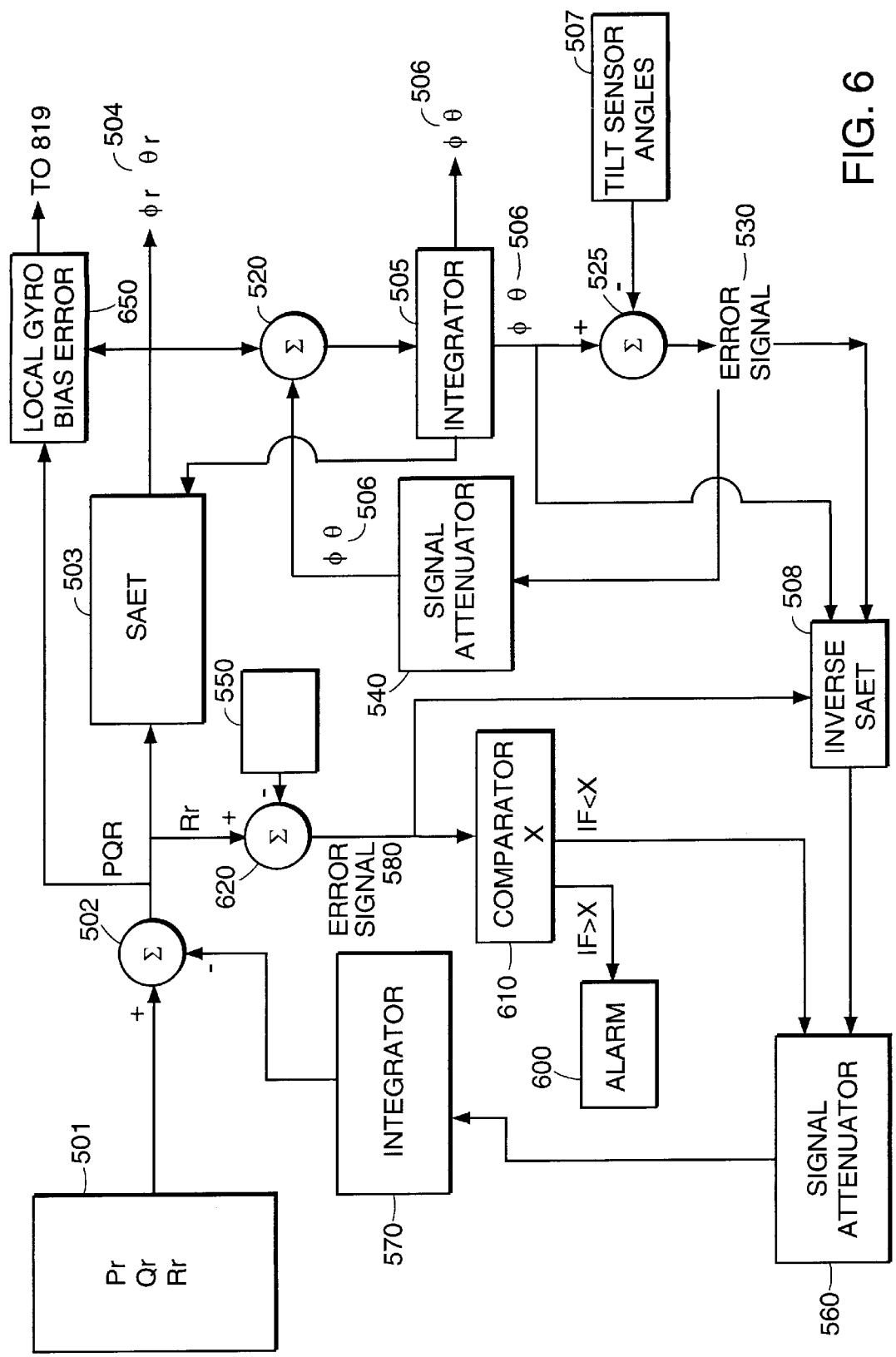
FIG. 6 is a functional block diagram for a three axis state estimator module in one embodiment of the invention.
Figure 1:
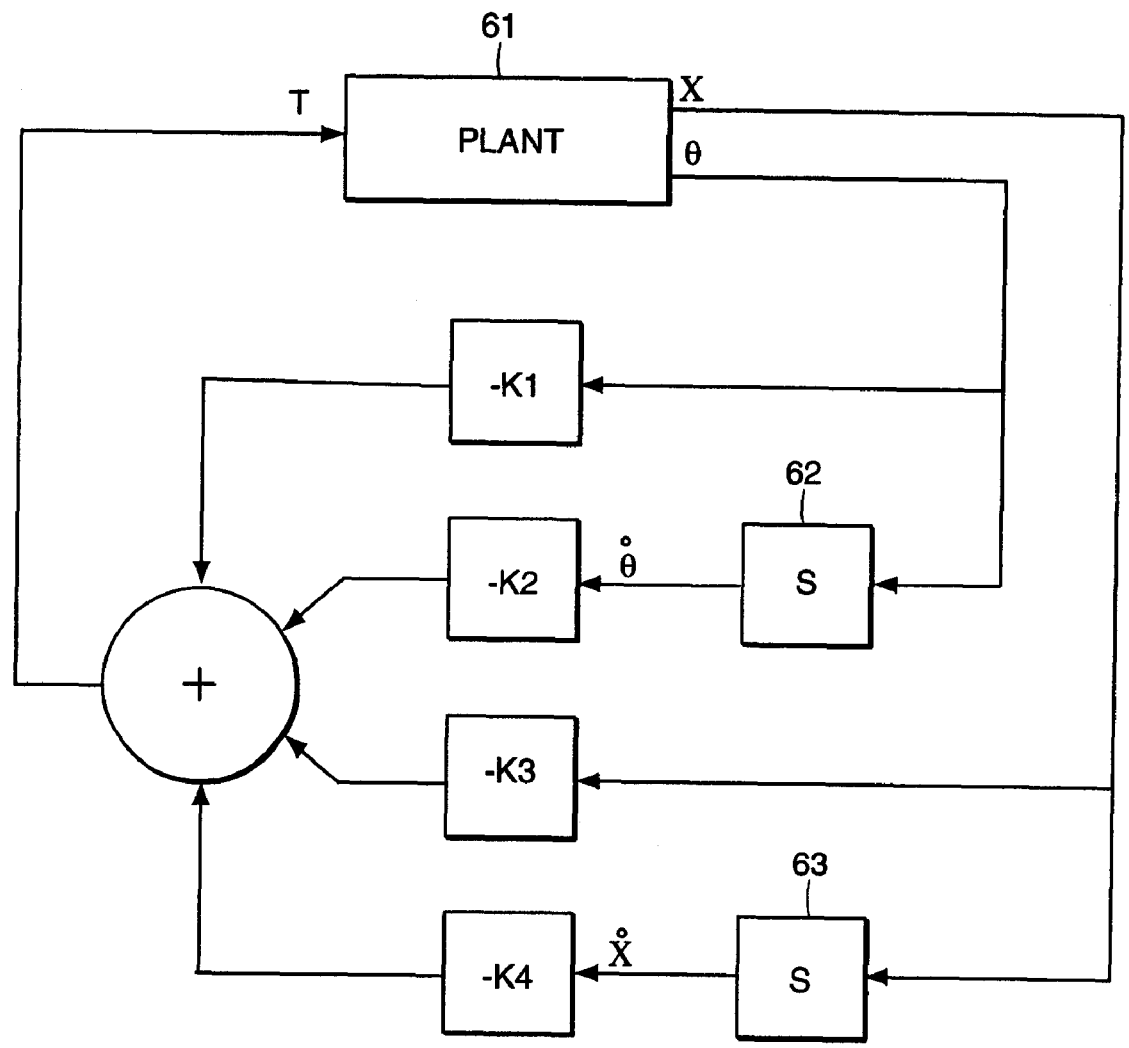

FIG. 6 shows a functional block diagram of the state estimator 402. The rotation rate signals 501, represented by $P_r$, $Q_r$, and $R_r$, from the virtual gyro construction 408, are first passed into a summer 502 which corrects for bias errors through a feedback loop. The corrected rotation rates are coordinate transformed from the V-frame to the E-frame using a small angle Euler transform (SAET) 503 thereby producing the E-frame pitch rate, roll rate, and yaw rate information 504, designated by $\Theta_r$, $\Phi_r$ and $\Psi_r$. $\Theta_r$ is then provided to the control loop of the vehicle. The E-frame rotation rates from the SAET 503 are passed into a summer 520 and are then integrated in the integration module 505 to produce the E-frame orientation angles 506 designated by $\Theta,\Phi$. $\Theta$ is then passed to the control loop of FIG. 1 of the vehicle. $\Theta$, $\Phi$ are also passed back for use in subsequent SAET transforms in SAET module 503. The integration module 505 at summer 525 takes the difference between $\Theta$ and the pitch angle 507 and $\Phi$ and the roll angle 507 respectively to generate pitch and roll error signals 530. The pitch angle and the roll angle 507 are provided by the tilt sensors 400. The error signals 530 are then passed to the inverse Euler transform 508 along with the E-frame orientation angles, $\Theta,\Phi$ 506. The pitch and roll error signals 530 are also fed back and passed through a filter 540 which attenuates the signal's strength. The attenuated signal is passed into the summer 520. The feedback loop is provided to correct for inaccuracies due to transients, so as to move the output readings of 506 in the direction of the tilt sensors. The attenuation of the signal attenuator 540 is provided to limit a large erroneous absolute reference sensor value from affecting the E-frame orientation angles. A large erroneous absolute reference sensor value may occur, for example, where the vehicle goes over a sudden bump. As the vehicle goes over a bump the absolute reference sensors will produce extraneous signals in the form of a transients which inaccurately reflect the pitch rate and the pitch angle.

In the inverse SAET 508 an inverse SAET is performed on the pitch, roll and yaw error information. In this inverse transform the error signals 530 of the pitch and roll are inserted in the inverse equation at $\Theta_r,\Phi_r$, and the yaw error signal 580 is inserted at $\Psi_r$ where one would expect to find the respective rates. $\Psi1_r$ is provided from summer 620 as the difference between Rr and the difference in the velocity of the wheels 550. Performing the inverse SAET on the error signals rather than the rates has the effect of partitioning the error information. The inverse SAET transforms the E-frame signals into the V-frame coordinate system. This signal is then passed through an attenuation filter 560. After the attenuation filter 560, the signals are placed in a integrator 570 and the then passed back to the summer 502. This feedback loop accounts for the long term bias drift of the gyroscopes. The attenuation filter 560 allows the tilt sensors which are more stable over long periods of time to assist in correcting for the drift of the gyroscopes while still allowing the gyroscopes to control short term changes.

Unlike the $p_r$ and $Q_r$ corrections which are proportional to the error signal, the yaw rate, $R_r$, correction is performed only up to a preset error level designated as X. This comparison is done in comparator 610. If the yaw rate error signal becomes larger than the preset error level X, correction to $R_r$ is suspended under the assumption that the wheels no longer represent the yaw rate and a suspension timer is started. The gyro rate value, $R_r$ is still compared to the delta wheel rate 550 during the suspension to calculate a yaw error signal 580. If after a predetermined amount of time the difference between the value of $R_r$ and that of the delta wheel rate is not below the preset error level, an alarm occurs 600 which in one embodiment is a visual signal. If after a second predetermined time on the suspension timer the difference does not fall below the preset error level, the yaw correction is shut off and an alarm sounds indicating that the system cannot distinguish between a fault and the drift error of the gyroscopes. If the second time limit is reached, the system must be reset. The preset error limit is imposed to prevent erroneous R data from being incorporated into the pitch state estimate when, for example, the vehicle is stationary on a moving platform that is turning.

To provide for accurate readings of the pitch state, upon initialization, the pitch state estimator attempts to align the gyroscopes to the tilt sensor as long as the system is non-accelerated. This is accomplished by adjusting the corner frequencies through the two signal attenuators 540 and 560 to orient the system to the tilt sensors. In the preferred embodiment, this is accomplished by adaptively adjusting the gain in response to an error signal. If during initialization the gyroscopes and the tilt sensors do not align, the system may pause and then re-measure the values for the tilt sensor and gyroscopes to see if they have aligned. If they do not align, the system may reverse the process and begin again until alignment is achieved.

If a gyro failure is detected, the state estimator 402 performs a single axis estimate of the pitch state which is described in U.S. Pat. Nos. 5,701,965 and 5,791,425. The same components and filters of the three axis state estimator are used in the single axis estimate as shown in FIG. 6. In the case of the single axis estimate, only the pitch rate for a selected gyroscope from the virtual gyro construction module 408 is passed into box 501. A further distinction is that in the single axis state estimator the difference in the velocities of the wheels which provides the yaw rate and rate for the three axis state estimator is used in the single axis state estimator only to assist in compensating for misalignment of the gyroscope for the pitch angle. A limiter is placed on this yaw rate to overcome situations where the wheels slip. In the single axis state estimator the yaw angle derived from the delta wheel velocities is passed to a summer for removing this component from the calculations and is passed into box 501. Additionally in box 501 a calibration module is added which corrects for misalignment of the gyroscope. To provide a smooth transition between the three axis state estimator and the single axis state estimator, the local gyro bias indicator 650 provides an initial condition for the integrator of 570 in single axis mode. Another difference between the three axis state estimator and the single axis estimator is that there is no SAET module 503 and inverse SAET 508 because the single axis state estimator must assume that $Q=\theta_r$ as there is no need to map the pitch in the V frame to the pitch in the E frame as the system is operating in a single plane as opposed to three dimensions. Additionally, the tilt sensor, which is preferably a two axis pendulous sensor, which provides a signal for both the pitch and roll is only used for the pitch signal and the roll signal is disregarded.

In a preferred embodiment there are six gyroscopes. Three gyroscopes are configured about the pitch axis of the V frame and the remaining three gyroscopes are set along a combination of the roll and yaw axes of the V frame. In such a fashion partially triple redundancy is provided. Each gyroscope situated about the pitch axis has an associated processor and tilt sensor the processor capable of providing a single axis state estimate from the associated gyroscope and tilt sensor. The processor receives signals from its associated gyroscope along with the signals from the three gyroscopes which mounted to sense rotation about the yaw and roll axes. The redundancy provides another failsafe system for the vehicle. Each of the three processors independently estimates the pitch state using either the associated gyroscope alone for a single axis state estimate or using both the associated gyroscope and the three remaining gyroscopes for a three axis state estimate. If all the gyroscopes are operating properly, the state estimates produced by the three processors will all agree. However, if one of the associated gyroscopes fails, the state estimates produced by the three processors will not agree. A voting mechanism may be implemented such that the processor producing the erroneous estimate shuts itself off. For further details concerning redundant failure prevention see U.S. Provisional Patent Application entitled FAULT-TOLERANT ARCHITECTURE FOR A PERSONAL VEHICLE, Ser. No. 60/105,069, filed on Oct. 21, 1998.

In another embodiment of the invention, if a gyro failure is detected, the signals to the wheel motors are automatically capped to limit the maximum rate of turn of the vehicle. Limiting the maximum rate of turn, limits the yaw rate and reduces the error arising from using a single axis state estimator.

In another embodiment of the invention, the roll angle is estimated by keeping track of the torque required to maintain zero pitch which corresponds to an estimate of ground slope and the amount of total turn since startup. For example, if ground slope is estimated at 10° up and then the machine is turned 90° left, roll can be estimated as 10° left.

Preferred embodiments of the invention may be implemented as a computer program product for use with a computer system or processor. Such implementation may include a series of computer instructions fixed either on a tangible medium, such as a computer readable media (e.g., a diskette, CD-ROM, ROM, or fixed disk) or transmittable to a computer system or processor, via a modem or other interface device, such as a communications adapter connected to a network over a medium. Medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the pitch estimator. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although the invention has been described with reference to several preferred embodiments, it will be understood by one of ordinary skill in the art that various modifications can be made without departing from the spirit and the scope of the invention, as set forth in the claims below.

What is claimed is:

1. A system for estimating a pitch state of a ground-traversing vehicle, the system comprising:
   a tilt sensor connected to the vehicle producing a pitch signal representing an estimate of a pitch angle of the vehicle about an E-frame of reference;
   at least one inertial reference sensor connected to the vehicle producing an inertial orientation signal about a V-Frame of reference; and
   a state estimator module receiving the pitch signal and the inertial orientation signal and calculating a pitch state signal from the inertial orientation signal and the pitch signal;
      wherein the pitch state signal is provided to a control loop of the vehicle for dynamically maintaining stability of the vehicle.

2. A system according to claim 1, wherein a pitch-angle error signal is calculated based on the pitch signal and the inertial orientation signal and is fed back to the state estimator module to adjust the inertial orientation signal.

3. The system according to claim 1, wherein the at least one inertial reference sensor is a gyroscope.

4. The system according to claim 1, wherein the at least one inertial reference sensor comprises at least three gyroscopes.

5. The system according to claim 4, further comprising a virtual-gyro construction module for receiving the inertial orientation signals of the at least three gyroscopes and outputting to the state estimator module three rotation rate signals, wherein each rotation rate signal represents a rotation rate about one axis of three perpendicular axes.

6. The system according to claim 5, wherein the state estimator module further comprises:
   a rotation transformation module which transforms the three rotation rate signals producing three E-frame of reference rotation rate signals; and
   an integrator module for producing orientation angles based on the three rotation rate signals.

7. The system according to claim 6, wherein the rotation transformation module performs a small angle Euler transformation.

8. The system according to claim 7, wherein the state estimator further comprises a summer which receives the orientation angles and a tilt sensor signal, the summer outputting an error signal.

9. The system according to claim 8 wherein the state estimator further includes an inverse small angel Euler transform module which receives the error signal and the producing a distributed error signal.

10. The system according to claim 9, wherein the state estimator module further includes a gyro-bias integrator which calculates a bias signal based at least on the distributed error signal and the orientation angles, the bias signal being output to the summer;
    wherein the output signal of the summer is fed back into the rotation transformation module.

11. The system according to claim 1, wherein the vehicle has at least two wheels, the state estimator module receives a wheel velocity signal representative of relative wheel velocities, the state estimator using the wheel velocity signal to calculate the yaw of the vehicle.

12. The method according to claim 11, further comprising:
    calculating an angle error signal based in part on the digital tilt signal and the digital inertial orientation signals in a state estimator module; and
    feeding back to the state estimator module the angle error signal.

13. The method according to claim 12, further comprising:
    providing to a control loop of the vehicle the pitch state signal for dynamically maintaining stability of the vehicle.

14. The system according to claim 1, further comprising:
    a fault detection module for detecting erroneous inertial orientation signals produced by the at least one inertial reference sensor.

15. The system according to claim 14, wherein the fault detection module generates a fault signal in response to the detection of an erroneous inertial orientation signal.

16. The system according to claim 15, wherein the state estimator module automatically switches from a three-axis estimate to a single axis estimate of the pitch state if a fault signal is created by the fault detection module.

17. A method for generating a pitch state signal used in the control of a ground-traversing vehicle, the method comprising:
measuring tilt of the vehicle with respect to gravity using an inclination sensor;
converting the tilt measurement into a digital tilt signal;
measuring the inertial orientation rates of the vehicle using at least three inertial sensors positioned in three or more non-collinear orientations on the vehicle;
converting the inertial orientation rate measurements of the three or more inertial orientation sensors into three or more digital inertial orientation signals; and
calculating a pitch state signal in a state estimator module based in part on the digital inertial orientation signals and the digital tilt signal.

18. The method according to claim 17, wherein the step of calculating includes the sub-steps of:
transforming the inertial orientation signals into three axial inertial orientation signals so that each signal corresponds to the orientation of one axis of three perpendicular axes;
transforming the three axial inertial orientation signals into gravity based orientation signals so that each signal corresponds to a gravity based orientation system;
transforming the three gravity based orientation signals into three angular signals, one signal representative of the pitch; and
providing the pitch to a control loop of the vehicle for dynamically maintaining stability of the vehicle.

19. A state estimator for estimating a pitch state of a vehicle, the state estimator comprising:
a processor for receiving a relative reference signal from each of a plurality of relative reference sensors and an absolute reference signal from an absolute reference sensor and determining a three axis pitch state of the vehicle;
wherein the processor automatically transitions to a single axis state estimation if a fault is declared by the processor.

20. A state estimator according to claim 19, wherein the state estimator further comprises:
a plurality of relative reference sensors each producing a relative reference signal coupled to the processor; and
an absolute reference sensor for producing an absolute reference signal coupled to the processor.

21. A state estimator according to claim 20, wherein the processor further comprises:
a virtual gyro construction module for transforming the signals from the relative reference sensors to signals representative of the projected relative reference signals on each of three perpendicular axes.

22. The state estimator according to claim 21, wherein the virtual gyro construction module performs a matrix transformation by multiplying the relative reference sensor signals by a construction matrix;
wherein the construction matrix is composed of coefficients which are selected from a combination of coefficients from an inverse least squares fit solution and coefficients representative of the relative reference sensor signals.

23. A state estimator according to claim 19, wherein the relative reference signals which are representative of rotation rate about a vehicle frame of reference are transformed to an absolute frame of reference through a small angle Euler transformation in the processor.

24. A state estimator according to claim 19, wherein the processor determines if a relative reference sensor is producing an erroneous signal by comparing a signal comprising of a combination of relative reference sensor signals to a predetermined value stored in a memory location associated with the processor.

25. A state estimator according to claim 24, wherein the combination signal is integrated with respect to time and the predetermined value is representative of an angle.

26. A state estimator according to claim 24, wherein the predetermined value is representative of an angle.

27. A state estimator according to claim 24, wherein the predetermined value is representative of a maximum rate.

28. A state estimator for measuring pitch state of a ground traversing vehicle, the state estimator comprising: a second order filter receiving a relative reference signal from each of a plurality of relative reference sensors and an absolute reference signal from an absolute reference sensor and outputting a pitch state estimate of the vehicle.

29. The state estimator according to claim 28, wherein the filter is part of a processor.

30. A state estimator according to claim 29, wherein the processor switches between a three axis pitch estimate and a single axis pitch estimate if at least one relative reference sensor is determined faulty.

31. A computer program product for use on a computer system for determining a pitch state of a ground traversing vehicle, the computer program product comprising a computer usable medium having computer readable program code thereon, the computer readable program code including:
computer code for receiving a pitch signal and an inertial orientation signal;
computer code for calculating a pitch state signal from the pitch signal and the inertial orientation signal; and
computer code for sending the pitch state signal to a control loop of the vehicle for dynamically maintaining stability of the vehicle.

32. A computer program product according to claim 31, further comprising:
computer code for determining if an inertial orientation sensor has failed based in part on the inertial orientation signal;
computer code for switching from a three axis pitch state estimation to a single axis pitch state estimation if an inertial orientation sensor has failed.

33. A computer program product according to claim 32, further comprising:
computer code for transforming the inertial orientation signals to signals representative of the projected inertial orientation signals on each of three perpendicular axes.

34. A computer program product according to claim 32, further comprising:
computer code for calculating a pitch-angle error signal based on the pitch signal and the inertial orientation signal and feeding back the pitch-angle error signal to the computer code for receiving a pitch signal and an inertial orientation signal to adjust the inertial orientation signal.

35. A computer program product according to claim 32, wherein the computer code for receiving an inertial orientation signal receives three inertial orientation signals, one inertial orientation signal each from three inertial orientation sensors;

the computer program product further comprising;

computer code for calculating three rotation rate signals based on the three inertial orientation signals, wherein each rotation rate signal represents a rotation rate about one axis of three perpendicular axes.

36. A computer program product according to claim 35, further comprising:

computer code for integrating the rotation rate signals to produce orientation angle signals.

37. A computer program product according to claim 36, further comprising:

computer code for detecting erroneous inertial orientation signals and creating a fault signal in response to the detection of an erroneous inertial orientation signal.

38. A computer program product according to claim 37, further comprising:

computer code for switching to a single axis estimate of the pitch state from a three axis estimate of the pitch state if a fault signal is created.

39. A computer program product according to claim 35, further comprising:

computer code for calculating a bias signal based at least on the pitch signal and the orientation angle signals, the bias signal being output to the computer code for receiving signals.

* * * * *

UNITED STATES PATENT AND TRADEMARK OFFICE
CERTIFICATE OF CORRECTION

PATENT NO.    : 6,332,103 B1
DATED         : December 18, 2001
INVENTOR(S)   : James Henry Steenson et al.

It is certified that error appears in the above-identified patent and that said Letters Patent is hereby corrected as shown below:

Drawings,
Replace Fig. 1 with the attached Fig. 1.

Column 10,
Line 38, replace "producing a distributed error signal" with -- orientation angles producing a distributed error signal --.

Signed and Sealed this

Ninth Day of December, 2003

JAMES E. ROGAN
*Director of the United States Patent and Trademark Office*